J. GARITY.
GLASS TELEGRAPH INSULATOR.

No. 110,645. Patented Jan. 3, 1871

United States Patent Office.

JOHN GARITY, OF EAST BIRMINGHAM, PENNSYLVANIA.

Letters Patent No. 110,645, dated January 3, 1871.

IMPROVEMENT IN GLASS TELEGRAPH-INSULATORS.

The Schedule referred to in these Letters Patent and making part of the same.

*To all whom it may concern:*

Be it known that I, JOHN GARITY, of East Birmingham, in the county of Alleghany and State of Pennsylvania, have invented a new and useful Improvement in Glass Telegraph-Insulator; and I do hereby declare the following to be a full, clear, and exact description thereof, reference being had to the accompanying drawing making a part of this specification, in which—

Figure 1:
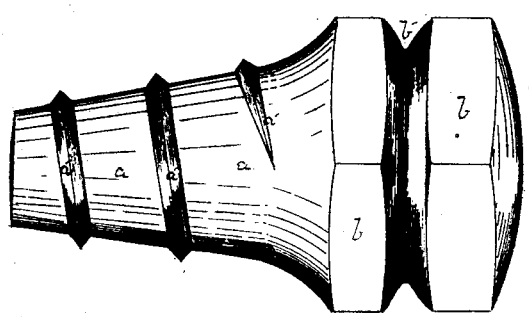
Figure 2:
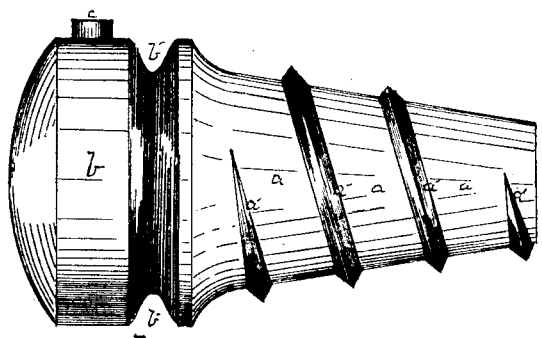

Figures 1 and 2 are side views of my improved telegraph-insulator, differing from each other only in the form of the head.

To enable others skilled in the art to make and use my invention, I will proceed to describe the same.

The insulator is made of solid glass by being pressed in a mold having suitable cavities, in any of the ways known to the art.

The part which is to be inserted into the telegraph-pole, cross-bar, or other support for the wires, is of a tapering cylindrical form, as shown at $a$.

On this I form, at the same time and in the same way the rest is formed, a screw-thread, $a'$, of any desired slope or angle of thread.

The head $b$ is grooved, as at $b'$, for convenience in attaching the telegraph wire, and is made with faces of other than circular form, as shown in fig. 1, for ease in screwing the pin $a$ into the telegraph-pole or other support.

With this form of insulator-head an ordinary wrench, of form to correspond, is used. Instead of a head of polygonal form, as in fig. 1, with which a wrench is used, a head of circular form may be used, as shown in fig. 2, but in the latter case a pin or lug, $c$, should be made on the circular head $b$, so as to admit of the screwing in of the pin $a$ by the use of an ordinary spanner of suitable form.

To secure the necessary strength at the base of the head, which commonly is the weakest point, I make the pin $a$ with a gradual taper from the base of the head to or toward the point, any desired distance, the object being to get a larger body of glass in the head-end of the pin $a$.

A solid glass insulator of the form described I have found to possess sufficient strength at all points for practical use, while it is simple in its construction, is made at small cost, and is easily applied.

I am aware that it is not new in the manufacture of telegraph insulators to thread a pin or shank which has a uniform diameter from the point to the base of the head. Insulators so made are exceedingly liable to break where the pin or shank joins the head, and hence I have devised the form or construction of insulator shown and described as an improvement thereon.

What I claim as my invention, and desire to secure by Letters Patent, is—

A solid glass telegraph-insulator, having a head, $b$, grooved, and of form suitable for use with either a wrench or spanner, and having also a threaded pin, $a$, the face of which tapers from the base of the head to or toward the point, substantially as and for the purposes set forth.

In testimony whereof I, the said JOHN GARITY, have hereunto set my hand.

JOHN GARITY.

Witnesses:
JOHN GLENN,
G. H. CHRISTY.